J. S. SCHOFIELD.

Horse-Power.

No. 6,268. Reissued Feb. 2, 1875.

WITNESSES

Henry N. Miller

C. L. Emerk.

INVENTOR

John S. Schofield per Alexander Thomson

ATTORNEYS

THE GRAPHIC CO. PHOTO-LITH. 39 & 41 PARK PLACE, N.Y.

UNITED STATES PATENT OFFICE.

JOHN S. SCHOFIELD, OF MACON, GEORGIA, ASSIGNOR OF ONE-HALF INTEREST TO JOSHUA R. SCHOFIELD.

IMPROVEMENT IN HORSE-POWERS.

Specification forming part of Letters Patent No. 155,111, dated September 15, 1874; reissue No. 6,268, dated February 2, 1875; application filed January 20, 1875.

*To all whom it may concern:*

Be it known that I, JOHN S. SCHOFIELD, of Macon, in the county of Bibb and State of Georgia, have invented certain new and useful Improvements in Horse-Powers; and I do hereby declare that the following is a full, clear, and exact description thereof, reference being had to the accompanying drawings, and to the letters of reference marked thereon, which form a part of this specification.

My invention relates to that class of horse-powers in which an armless wheel is made to revolve and transmit power to a band-wheel within the same; and the nature of my invention consists in the combination, with an armless revolving wheel, of a single shaft running across the center, and provided with a pinion on each end, one of said pinions being loose and the other fast on the shaft, and a band-wheel secured at any suitable point on the shaft.

In order to enable others skilled in the art to which my invention appertains to make and use the same, I will now proceed to describe its construction and operation, referring to the annexed drawing, in which—

Figure 1:
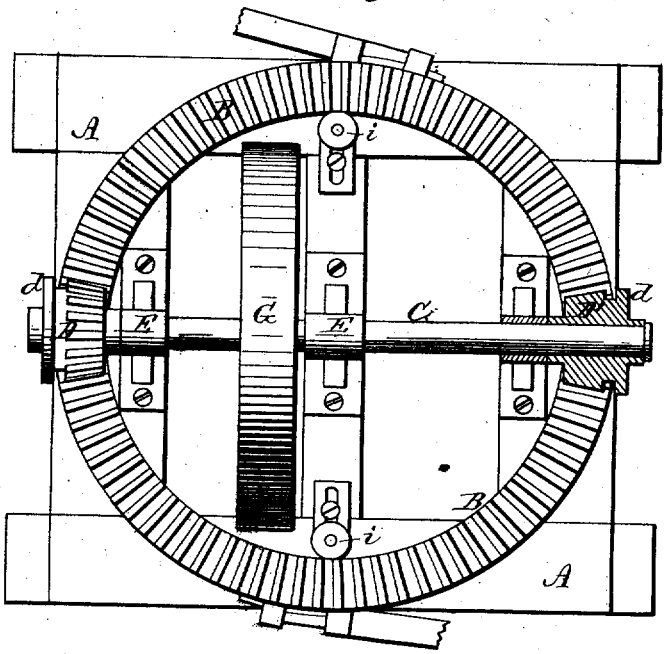
Figure 2:
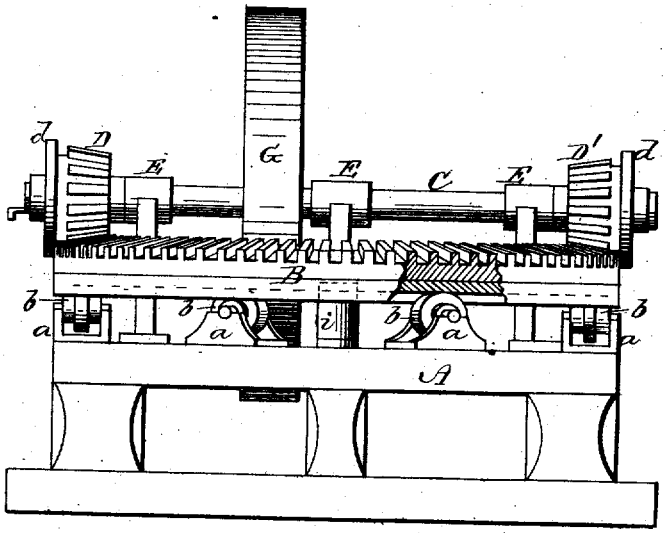

Figure 1 is a plan view of a horse-power embodying my invention, and Fig. 2 is a side elevation of the same.

A represents the base of my horse-power, upon which, at suitable points, are secured boxes or bearings *a a*, containing friction-rollers *b b*. These rollers support an armless master-wheel, B, the rollers entering a circular groove made in the under side thereof. Across the center, and above this wheel B, is a shaft, C, having its bearings in suitable standards E E, secured on the base A. On the shaft C, at any suitable point, is secured the band-wheel G, from which motion is to be communicated by a belt to the machine to be driven. On one end of said shaft is a pinion, D, secured thereto, and on the other end is a loose pinion, D′, both gearing with the master-wheel B. These pinions are formed or provided with flanges or disks *d* on their outer sides, which project on the sides of the master-wheel B, as shown in Fig. 2. These flanges, in conjunction with rollers *i i* on the inner side of said wheel, hold it in position, and prevent any side motion of the same. The rollers *i i* are held in adjustable bearings, and are arranged on a line at right angles with the shaft C.

Heretofore, in horse-powers employing an armless revolving wheel, there has been two or more counter-shafts gearing into the master-wheel, for the purpose of keeping it in position, and radiating toward the center for the transmission of power, being geared together at the center. In my machine I obtain the same result by a single shaft having a pinion at each end; and as it is evident these pinions must travel in opposite directions, one of them is made fast to the shaft, and the other is loose thereon.

Having thus fully described my invention, what I claim as new, and desire to secure by Letters Patent, is—

1. The combination of the master-wheel B, the single central shaft C, with a pinion, D, secured on one end thereof, and a pinion, D′, placed loosely upon the other end, and said pinions provided with flanges *d d*, all substantially as and for the purposes herein set forth.

2. The combination of the master-wheel B, the flanges *d d*, cast with the pinions D D′, and the friction guide-rollers *i i*, secured to the adjustable bearings mounted upon the base A, all as and for the purposes set forth.

3. The combination of the base A, the rollers *b* and *i*, the grooved master-wheel B, the shaft C, and the pinions D D′, with flanges *d d*, all substantially as and for the purposes set forth.

In testimony that I claim the foregoing I have hereunto set my hand this 31st day of December, 1874.

JOHN S. SCHOFIELD.

Witnesses:
W. S. CLARKE,
A. C. CLIETT.